US012783650B2

(12) United States Patent
Strogov et al.

(10) Patent No.: US 12,783,650 B2

(45) Date of Patent: Nov. 3, 2026

(54) MANAGING API CALLS WITH DYNAMIC RESPONDING TO SECURITY THREATS

(71) Applicant: Acronis International GmbH, Schaffhausen (CH)

(72) Inventors: Vladimir Strogov, Singapore (SG); Alexey Kostyushko, Yerevan (AM); Aliaksei Dodz, Singapore (SG); Anastasia Pereberina, Istanbul (TR); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 232 days.

(21) Appl. No.: 18/613,984

(22) Filed: Mar. 22, 2024

(65) Prior Publication Data

US 2025/0298893 A1 Sep. 25, 2025

(51) Int. Cl.
*G06F 21/55* (2013.01)
*G06F 21/52* (2013.01)

(52) U.S. Cl.
CPC ............ *G06F 21/554* (2013.01); *G06F 21/52* (2013.01)

(58) Field of Classification Search
CPC .... G06F 21/52; G06F 21/55; G06F 2221/033; G06F 2221/034; G06F 9/30; G06F 9/44; G06F 21/53; G06F 21/554; G06F 21/566; G06F 21/54; G06F 2209/542; H04L 63/1433; H04L 63/1441; H04L 51/212; H04L 63/10; H04L 63/1408; H04L 63/1425; H04L 63/105; H04L 63/14
See application file for complete search history.

(56) References Cited

U.S. PATENT DOCUMENTS

| | | | | |
|---|---|---|---|---|
| 8,255,931 | B2 * | 8/2012 | Sandoval | G06F 9/4812 717/162 |
| 8,782,744 | B1 * | 7/2014 | Fuller | G06F 21/629 709/225 |
| 11,681,591 | B2 | 6/2023 | Kulaga et al. | |

(Continued)

FOREIGN PATENT DOCUMENTS

| | | | |
|---|---|---|---|
| CN | 111367684 | A | 7/2020 |
| CN | 114466053 | A | 5/2022 |

OTHER PUBLICATIONS

Acronis, Simplify endpoint security with Acronis to unlock unmatched business continuity, https://www.acronis.com/en-us/solutions/cloud/endpoint-protection/, Endpoint protection for Service providers—Acronis.pdf May 14, 2024.

(Continued)

*Primary Examiner* — Wasika Nipa
*Assistant Examiner* — Edgar W Xie
(74) *Attorney, Agent, or Firm* — ESPE Legal Consultancy FZ-LLC

(57) ABSTRACT

Systems and methods for securing and managing API calls. A security dynamic link library (DLL) is a user mode component that intercepts API calls from an API client to an API server. A security kernel driver is a kernel mode component that hooks API calls from the security DLL to the API server. A protection service receives, analyzes, and processes API calls from the security DLL and the security kernel driver.

20 Claims, 7 Drawing Sheets

(56) References Cited

U.S. PATENT DOCUMENTS

| | | | | |
|---|---|---|---|---|
| 11,698,808 | B2 | 7/2023 | Sergeev et al. | |
| 2018/0004943 | A1 * | 1/2018 | Lukacs | G06F 9/542 |

OTHER PUBLICATIONS

Acronis, Endpoint Detection and Response for service providers, https://www.acronis.com/en-eu/products/cloud/cyber-protect/security-edr/, Advanced Security + Endpoint Detection and Response Solutions for MSP.pdf May 14, 2024.

* cited by examiner

MANAGING API CALLS WITH DYNAMIC RESPONDING TO SECURITY THREATS

The present disclosure relates to securing computing systems and networks. More particularly, the disclosure relates to secure management of API calls in a computer system.

BACKGROUND

Application programming interfaces (APIs) are interfaces that enable communication and interaction between different software components or systems. APIs can provide various functionalities, such as accessing data, performing operations, or invoking services. APIs can also expose sensitive or critical information, such as user credentials, personal data, or system configuration. Therefore, securing and managing API calls is an important aspect of ensuring the reliability, integrity, and confidentiality of software systems and the data they process.

Conventional methods of securing and managing API calls are often insufficient, ineffective, or inefficient. For example, some methods rely on static or predefined security rules or policies, which may not be able to cope with the dynamic and evolving nature of API calls and the threats they face. Some methods use encryption or authentication techniques, which may introduce additional overhead or complexity to the API calls and the systems that use them. Some methods monitor or analyze the API calls at a single point or level, which may not provide a comprehensive or holistic view of the API calls and their context.

Therefore, there is a need for improved methods and systems for securing and managing API calls that can overcome the limitations of the conventional methods. There is a need for methods and systems that can provide real-time, adaptive, and proactive security and management of API calls at multiple levels and stages.

SUMMARY

A system and method for managing Application Program Interface (API) calls from a client to an API server in a computer system comprising a security kernel driver and a protection service are disclosed. In an exemplary embodiment, the method comprises injecting a security dynamic link library (DLL) into the API server. The DLL is configured to monitor API calls related to specific system functions by hooking API calls of a client to the API server by the security DLL and analyzing the API call information by the security DLL to determine the identity of the client, and impersonate the client to get the security rights of the client.

The API call is prefiltered by the security DLL by evaluating parameters of the API call against a predefined security DLL policy to determine the API call status. The API call is passed to the security kernel driver for determinations about further processing. These determinations include whether to preprocess the API call, and whether the preprocessing will be synchronous or asynchronous. The security kernel driver also determines whether to postprocess the API call. The postprocessing can be synchronous or asynchronous depending on the nature of the API call. In some cases, however, the API call is allowed to pass through after security DLL analysis and is executed without invoking the security kernel driver.

The API call is prefiltered by the security kernel driver by evaluating input parameters of the API call and the results of API call information analysis by the security DLL against predefined security kernel driver policy to determine the API call status. Possible results are rejection of the API call or allowing the API call to pass through. The API call is preprocessed by the security kernel driver in connection with the protection service, based on input parameters by analyzing the API call information based on the predefined kernel policy to determine whether the API call should be rejected, or whether input parameters of the API call should be modified. API call input parameters may also be modified.

Synchronous preprocessing comprises communicating the API call modified input parameters to the protection service to get a first synchronous verdict and either rejecting the API call with modified input parameters based on the first synchronous verdict or allowing the API call with modified input parameters to be executed based on the first synchronous verdict to get the API call output parameters. Asynchronous processing comprises allowing the API call with modified input parameters to be executed to get the API call output parameters, communicating the modified input parameters to the protection service to get a first asynchronous verdict, and postprocessing the API call based on the API call output parameters. Postprocessing can continue while a verdict is being reached. Postprocessing comprises either synchronous or asynchronous postprocessing. For example, synchronous postprocessing stops execution of a suspect API call immediately while asynchronous postprocessing allows execution to continue while monitoring the suspect API in case further action is needed.

In an embodiment, API call output parameters are communicated to the security service to get a second synchronous verdict and either reject the API call based on the second synchronous verdict or adjust the API call output parameters, allowing the API call with adjusted output parameters based on the second synchronous verdict. Asynchronous processing can also be implemented in such embodiments.

In an embodiment, processing the API call by the security kernel driver comprises collecting for audit purposes the API call information and initiating by the security kernel driver a security action based on the first synchronous verdict. The security action comprises initiating a protection mechanism. Remediation mechanisms are part of asynchronous postprocessing and take place after an API call is executed; API calls are not executed however if rejected during synchronous processing.

In an embodiment, the security kernel driver initiates a security action based on the synchronous or asynchronous verdicts, wherein the security action is one of initiating a protection mechanism, executing remediation procedures, or triggering a rollback of system changes associated with the API call.

In an embodiment, the protection service isolates affected system components, alerts system administrators, or updates system security configurations. Remediation procedures can involve a rollback comprising reversing the effects of the API call and restoring affected system settings or files to a previous state. The rollback can also comprise reverting system changes made as a result of the API call to a predefined safe state.

In some embodiments, the API call is allowed to execute without preprocessing but is still postprocessed, either synchronously or asynchronously, depending on the nature of the API call.

In an embodiment, a system for managing API calls in a computer system comprises a security kernel driver; a security dynamic link library (DLL) injected into an API server, the DLL configured to monitor API calls related to specific system functions, hook an API call of a client to the API server, analyze the API call information to determine an identity of the client, impersonate the client to get security rights of the client, prefilter the API call by evaluating parameters of the API call against a predefined security DLL policy to determine an API call status, and pass the API call to a security kernel driver; the security kernel driver configured to: optionally preprocess the API call, wherein preprocessing comprises at least one of synchronous or asynchronous preprocessing (in other embodiments, the security kernel driver is configured to allow execution of the API call without preprocessing), execute the API call, and determine that the API call requires postprocessing. A system can further comprise a protection service configured to receive API call parameters, return a verdict, and allow or not allow the API call.

Figure 1:
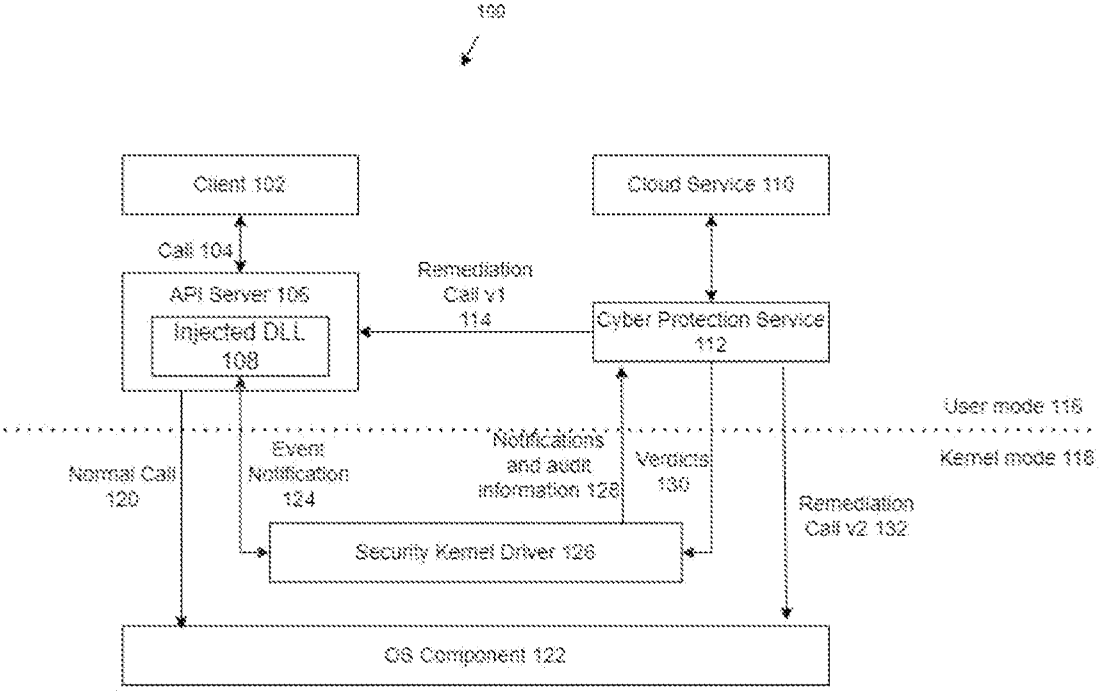
FIG. 1 is a block diagram of an API call management system in accordance with an embodiment.

The embodiments described are exemplary ways to use the invention to solve technical problems in the field of the invention. The solutions and techniques disclosed may also be used to solve other problems in the field or to solve similar problems in other fields. Substitutions, modifications, and equivalents known to those of skill in the art may be used to implement these solutions and techniques, consistent with scope of the invention described in the claims.

DETAILED DESCRIPTION

According to embodiments of the present invention, systems and methods for securing and managing API calls are disclosed and contemplated herein. The security dynamic link library (DLL) is a user mode component that intercepts API calls from an API client to an API server. A security kernel driver is a kernel mode component that hooks API calls from the security DLL to the API server. A protection service (which can be a cloud-based component) receives, analyzes, and processes API calls from the security DLL and the security kernel driver.

In some embodiments, the security DLL and the security kernel driver communicate with each other using a shared memory mechanism, such as a memory mapped file or a named pipe. This allows for fast and secure data transfer between the user mode and the kernel mode components of the system. The shared memory mechanism can also be used to store the security policies for the prefiltering and processing stages, as well as the audit information and the security actions performed by the security kernel driver.

In some embodiments, the security DLL policy and the security kernel driver policy are dynamically updated by the protection service based on the current threat landscape and the system configuration. The protection service can also provide feedback to the security DLL and the security kernel driver based on the analysis and verdicts of the API calls, allowing for adaptive and proactive security measures. For example, the protection service can adjust the prefiltering thresholds, modify the input parameters of the API calls, or initiate security actions in response to emerging threats or anomalous behaviors.

In some embodiments, the security DLL and the security kernel driver can perform additional security checks and validations on the API calls before and after communication with the protection service. For example, the security DLL can verify the authenticity and integrity of the API server and the client, while the security kernel driver can validate the signatures and hashes of the API call input and output parameters. These checks and validations can help to prevent tampering, spoofing, or hijacking of the API calls by malicious actors.

In some embodiments, the protection service can perform various types of analysis and processing on the API calls, such as behavioral analysis, content analysis, data loss prevention (DLP), risk assessment, threat detection, or anomaly detection. The protection service can use various techniques and tools, such as machine learning, artificial intelligence, or big data analytics, to perform the analysis and processing. The protection service can also compare the API calls with historical or contextual data, such as previous API calls, user profiles, or system configurations, to enhance the accuracy and reliability of the analysis and processing.

In some embodiments, the protection service can generate various types of outputs and actions based on the analysis and processing of the API calls, such as verdicts, scores, recommendations, or reports. The protection service can also perform or initiate various types of security actions, such as blocking, alerting, quarantining, or sanitizing the API calls, or applying security patches or updates to the API client or the API server. The protection service can also provide feedback or guidance to the security DLL and the security kernel driver to improve their security and management of the API calls.

API hooking is accomplished by the security DLL according to some embodiments of the present invention. API hooking allows intercepting and modifying the behavior of API calls. API hooking can be used for monitoring, debugging, or enhancing the functionality of API calls. In some embodiments, the security DLL uses API hooking to analyze and filter the API calls related to critical system functions, such as those that modify local Windows registry objects. To perform API hooking, the security DLL first needs to be injected into the address space of the API server process. This can be done by various methods, such as using the CreateRemoteThread or NtCreateThreadEx Windows functions, which allow creating a new thread in another process and executing a specified function. The function executed by the new thread can be the LoadLibrary function, which loads the security DLL into the process memory. Alternatively, the security DLL can be loaded into the process by modifying the import address table (IAT) of the process, which contains pointers to the addresses of imported DLLs. By changing the pointer of an imported DLL to point to the security DLL, the process will load the security DLL when it tries to load the original DLL.

Once the security DLL is loaded into the process memory, the security DLL hooks the API calls by modifying the memory addresses of the target functions. For example, the security DLL can use the VirtualProtect function to change the memory protection of the first bytes of the target function, making them writable. Then, the security DLL can overwrite the first bytes with a JMP instruction, which redirects the execution flow to a custom function defined by the security DLL. This custom function can perform the desired analysis and filtering of the API call, and then optionally call the original function or return a custom value. To call the original function, the security DLL can store the overwritten bytes in a separate memory location and restore the overwritten bytes before calling the original function.

By using this technique, the security DLL can effectively hook any API call made by the API server process, and perform various security tasks, such as impersonating the requestor, pre-filtering the API call, communicating with the security kernel driver, and modifying the input or output parameters of the API call.

Prefiltering by the security DLL works by comparing the parameters of the API call against a predefined security policy, which specifies the conditions for allowing, rejecting, or requiring further processing by the security kernel driver. The security policy can be based on various factors, such as the type of API call, the identity and rights of the requestor, the target system function, the input and output data, and the potential security risks. For example, the security policy can allow read-only API calls, but require further processing for write API calls that modify system-critical functions. The security policy can also block API calls from unknown or unauthorized requestors, or filter API calls that contain malicious or suspicious data. The security DLL communicates with the protection service to obtain and update the security policy, as well as to send information about the API calls and their prefiltering status. The security DLL checks the basic parameters of the API call without performing any complex analysis or modification of the API call. The security DLL can also determine whether further processing is needed. The security kernel driver decides whether processing is synchronous or asynchronous, depending on the urgency and complexity of the API call. The security DLL aims to optimize the performance and security of the API call management process by filtering out benign or malicious API calls and passing on only those that require deeper inspection and processing by the security kernel driver.

The security kernel driver works at a lower level than the security DLL, operating within the kernel mode of the operating system. This gives the security kernel driver more access and control over the system resources and functions, as well as more security and protection from external interference. The security kernel driver can perform deeper and more complex analysis and filtering of the API calls, as well as modify API calls' input and output parameters based on the security policy and the verdicts from the protection service. The security kernel driver also communicates with the protection service, which can include various security components and services, such as endpoint detection and response (EDR), antivirus, data loss prevention (DLP), cloud security, etc. The security kernel driver can initiate different security actions based on the verdicts, such as isolating, alerting, updating, reversing, or rolling back the API calls that pose security threats. The security kernel driver can handle both synchronous and asynchronous processing of the API calls, depending on the urgency and complexity of the API call and the security policy.

The security kernel driver is different from the security DLL in several ways. First, the security DLL works in the user mode of the operating system, which has less access and control over the system resources and functions and is more vulnerable to external attacks. Second, the security DLL performs only "light" prefiltering of the API calls, meaning that the security DLL only checks the basic parameters of the API call against a predefined security policy and does not perform any complex analysis or modification of the API call. Third, the security DLL relies on the security kernel driver for further processing of the API calls that require deeper inspection and response, as well as for communicating with the protection service. Fourth, the security DLL mainly focuses on hooking and analyzing the API calls, determining the identity and rights of the requestor, and impersonating the requestor to get client security rights. Fifth, the security DLL can only determine whether further processing is needed. The security kernel driver determines whether processing is synchronous or asynchronous.

The protection service is a system that includes various security components and services that provide protection against cyber threats. The protection service differs from the security DLL and the security kernel driver in several ways. First, the protection service is not directly involved in hooking, analyzing, or filtering API calls, but rather receives information and requests from the security kernel driver for further verdicts and actions. Second, the protection service can perform more advanced and comprehensive security analysis and response, such as malware scanning, reputation checking, cloud security, etc. Third, the protection service can include multiple security clients, such as endpoint detection and response (EDR), antivirus, data loss prevention (DLP), and others, which can coordinate and collaborate to enhance the overall security of the system. Fourth, the protection service can communicate with external sources, such as cloud security services, to obtain additional information and intelligence on the API calls and their requestors.

Synchronous processing is one processing option. For example, the security DLL detects an API call that tries to write a new value to a registry key that controls the system startup configuration. The security DLL evaluates the parameters of the API call against the security policy and determines that the API call requires further processing by the security kernel driver. The security DLL communicates the API call information to the security kernel driver and waits for its response. The security kernel driver analyzes the API call information and modifies the input parameter to prevent the registry key from being overwritten. The security kernel driver then communicates the modified input parameter to the protection service and requests a synchronous verdict. The protection service performs a malware scan on the requestor and the input parameter and returns a verdict to the security kernel driver, indicating whether the API call should be allowed or rejected. The security kernel driver then either allows the API call with the modified input parameter to execute and updates the registry key or rejects the API call and blocks the registry change. The security kernel driver also initiates a security action based on the verdict, such as isolating the requestor, alerting the system administrator, or updating the system security configuration.

Asynchronous processing is another processing option. For example, the security DLL detects an API call that tries to create a new scheduled task that launches an executable file on every system boot. The security DLL evaluates the parameters of the API call against the security policy and determines that the API call requires further processing by the security kernel driver. The security DLL communicates the API call information to the security kernel driver and allows the API call to execute without waiting for its response. The security kernel driver analyzes the API call information and preprocesses the input parameter to check the validity and reputation of the executable file. The security kernel driver then communicates the input parameter to the protection service and requests an asynchronous verdict. The protection service performs a deeper malware scan on the executable file and returns a verdict to the security kernel driver, indicating whether the API call poses a security threat. The security kernel driver then initiates a security action based on the verdict, such as deleting the scheduled task, reversing the effects of the executable file, or triggering a rollback of system changes associated with the API call. The security kernel driver and protection service also collect the API call information for audit purposes.

The type of processing required by the security kernel driver depends on the nature and urgency of the API call, as well as the policies defined by the security DLL and the protection service. Synchronous processing means that the security kernel driver waits for a verdict from the protection service before allowing or rejecting the API call. This ensures a high level of security but may introduce latency and performance issues. Asynchronous processing means that the security kernel driver allows the API call to execute and then performs postprocessing based on a later verdict from the protection service. This improves efficiency and responsiveness but may increase the risk of malware infection or system damage.

As described above, an example of an API call that requires synchronous processing is writing a new value to a registry key that controls the system startup configuration. System startup configuration is a critical system function that can affect the system's boot sequence and security settings. The security kernel driver modifies the input parameter to prevent the registry key from being overwritten, and then requests a synchronous verdict from the protection service. Based on the verdict, the security kernel driver either allows the API call with the modified input parameter to execute and updates the registry key or blocks the API call and the registry change. The security kernel driver also initiates a security action based on the verdict, such as isolating the requestor, alerting the system administrator, increasing the aggressiveness of the security settings, including the settings for the subsequent postprocessing or updating the system security configuration.

An example of processing an API call comprises the following. A client application sends an API call to a remote registry interface based on an RPC server, requesting to write a new value to a registry key that controls the system startup behavior. The API call contains the input parameters of the registry key name, value name, data type, and data value. The security DLL injected into the RPC server hooks the API call and analyzes the API call's information. The security DLL determines the identity of the requestor by impersonating the requester and checking the requester's security rights. The security DLL also evaluates the input parameters against the security DLL policy, which specifies that any write operation to the registry requires further processing by the security kernel driver. The security DLL communicates the API call information and status to the security kernel driver.

The security kernel driver pre-filters the API call by evaluating its input parameters and the results of the security DLL analysis against the security kernel driver policy. The security kernel driver decides that the API call should be processed synchronously, since it involves modifying a system-critical function that may have security implications. The security kernel driver also decides that the API call requires both preprocessing and postprocessing, since the input parameters may need to be modified before execution and the output parameters may need to be filtered after execution. The security kernel driver modifies the input parameters by appending a random string to the data value, making the data value invalid for the registry key. This is done to prevent the API call from executing successfully and changing the system startup behavior before getting a verdict from the cyber protection service.

The security kernel driver allows the API call with the modified input parameters to execute and returns the output parameters, which indicate an error due to the invalid data value.

The security kernel driver communicates the modified input parameters and the output parameters to the cyber protection service and requests an asynchronous verdict. The cyber protection service performs an analysis of the API call information, including scanning the requestor application for malware, checking the reputation of the registry key, and comparing the data value (without the appended random string) with known malicious values. The cyber protection service returns an asynchronous verdict to the security kernel driver, indicating that the API call is malicious and should be rejected.

The security kernel driver initiates a security action based on the asynchronous verdict, such as alerting the system administrator, isolating the requestor application, or triggering a rollback of any system changes associated with the API call. The security kernel driver also collects the API call information for audit purposes and logs the incident.

Another example of processing an API call comprises the following. A client application sends an API call to a COM server, requesting to enumerate the files in a folder on the system. The API call contains the input parameter of the folder path. The security DLL injected into the COM server hooks the API call and analyzes its information. The security DLL determines the identity of the requestor by impersonating the requestor and checks the requester's security rights. The security DLL also evaluates the input parameter against the security DLL policy, which specifies that any read operation on the file system is allowed, unless the folder path contains sensitive information. The security DLL communicates the API call information and status to the security kernel driver.

The security kernel driver pre-filters the API call by evaluating the input parameter(s) of the API call and the results of the security DLL analysis against the security kernel driver policy. The security kernel driver decides that the API call should be passed through, since the API call involves a harmless read operation on a non-sensitive folder. The security kernel driver does not modify the input parameter or require further processing by the cyber protection service. The security kernel driver allows the API call to execute and returns the output parameter, which is the list of files in the folder. The security kernel driver communicates the output parameter to the cyber protection service and requests an asynchronous verdict. The cyber protection service performs a light analysis of the output parameter, such as checking the file names for suspicious patterns or extensions. The cyber protection service allows the API call while awaiting an asynchronous verdict. When the verdict arrives the API call is passed to the security kernel driver, indicating that the API call is benign and can be allowed. The security kernel driver does not initiate any security action based on the asynchronous verdict, since the API call is harmless and does not require any remediation. The security kernel driver also collects the API call information for audit purposes and logs the activity.

Postprocessing can include registry enumeration. Registry enumeration results filtering involves hiding or modifying the output parameters of an API call that enumerates the registry keys and values in a given subtree, such as RegEnumKeyExW or RegEnumValueW. The purpose of this postprocessing is to protect sensitive information that may be exposed by the registry enumeration, such as passwords, encryption keys, or personal data. The postprocessing can be done by the security kernel driver based on the policy of the protection service, which can specify which registry paths or values should be filtered out or replaced with dummy data. For example, if the API call returns a list of registry values under HKLM\Software\Microsoft\Cryptography, the postprocessing can replace the value of MachineGuid with a random string to prevent revealing the unique identifier of the machine.

Postprocessing can include file system access control list (ACL) modification. File system ACL modification includes changing the output parameters of an API call that queries or sets the ACL of a file or folder, such as GetNamedsecurityInfoW or SetNamedsecurityInfoW. The purpose of this postprocessing is to enforce a custom security policy that may differ from the default ACL of the file system, such as restricting or granting access to certain users or groups. The postprocessing can be done by the security kernel driver based on the policy of the protection service, which can specify which files or folders should have their ACL modified and what permissions should be applied. For example, if the API call sets the ACL of a file named secret.txt to allow read and write access to everyone, the postprocessing can override the ACL to only allow read access to the owner and deny access to anyone else.

Postprocessing can include scheduled task creation monitoring. Scheduled task creation monitoring involves analyzing the output parameters of an API call that creates or modifies a scheduled task, such as ITaskScheduler:NewWorkItem or ITaskService:CreateTask. The purpose of this postprocessing is to detect and prevent potentially malicious activities that may use scheduled tasks to execute malware or perform unauthorized actions. The postprocessing can be done by the protection service based on the policy of the security kernel driver, which can specify which types of tasks should be monitored or blocked. For example, if the API call creates a new task that runs an executable file named evil.exe every boot, the postprocessing can flag the task as suspicious and send the task to the protection service for further analysis and remediation. Alternatively, the postprocessing can modify the output parameters of the API call to prevent the task from being created or change its settings to make the task harmless. Such postprocessing is an example of synchronous processing.

FIG. 1 shows an exemplary system 100. In an embodiment, system 100 comprises security kernel driver 126 and a security DLL. In an embodiment, system 100 further comprises a protection service. In an embodiment, system 100 further comprises client 102 and API server 106. Client 102 sends call 104 to API server 106 with injected DLL 108. In an embodiment, cloud service 110 hosts protection service 112. Alternatively, protection service 112 can be hosted locally. Protection service 112 is configured to send remediation call vl to API server 106. Client 102, API server 106 (with injected DLL 108), cloud service 110, and protection service 112 of system 100 are part of user mode 116. Kernel mode 118 receives normal call 120 from API server 106 at OS component 122. Event notification 124 is communicated between Injected DLL 108 and security kernel driver 126. Notifications and audit information 128 is passed from security kernel driver 126 to protection service 112. Protection service 112 returns verdicts 130 to security kernel driver 126.

Figure 2:
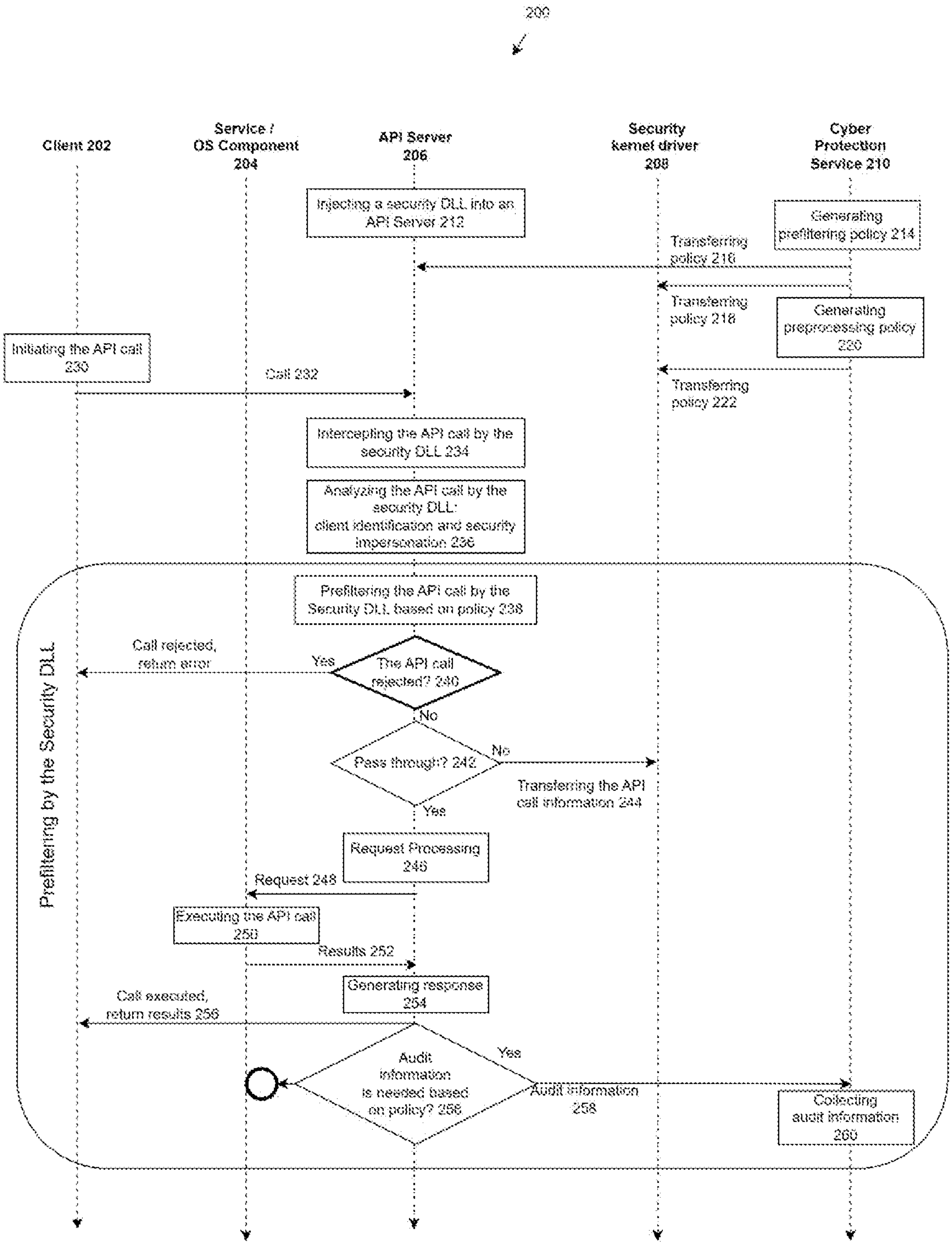
FIG. 2 is the first in a series of process flow diagrams showing aspects of a method in accordance with an embodiment.

FIG. 2 shows an exemplary aspect 200 of an implementation of a method for secure management of API calls. The method involves client 202, a service or operating system (OS) component 204, an API server 206, a security kernel driver 208, and a service 210, which functions as a cybersecurity protection service. The sequence of actions performed by each of elements 202-210 generally flows from top to bottom. For example, a security DLL is injected into API server 206 at operation 212. A prefiltering policy that was generated by service 210 at operation 214 is transferred to API server 206 at operation 216. Service 210 also generates a processing policy at operation 220 which is transferred at operation 222 to security kernel driver 208.

Client 202 initiates an API call at operation 230 and call 232 is passed to API server 206. At API server 206, the API call is intercepted by the security DLL at operation 234. At operation 236, the API call is analyzed by the security DLL. At this operation, the security DLL can use client identification and security impersonation in the course of analyzing the API call.

Prefiltering by the security DLL starts at operation 238 by applying the policy received from service 210. If the API call is rejected at operation 240, an error is returned to client 202. If the API call is not rejected at operation 240, at operation 242 a decision is made about whether to allow the API call to pass through. If the decision is no, the API call information is passed to security kernel driver 208 at operation 244. If the decision is yes, a request for processing is made at operation 246 as request 248 comprising the API call is passed to service/OS component 204. Service/OS component 204 executes the API call at operation 250 and passes results 252 to the API server. A response is generated at the API server at operation 254 and results 256 are returned to client 202. If auditing information is needed, at operation 256 audit information 258 is passed to service 210, which collects audit information at operation 260.

Figure 3:
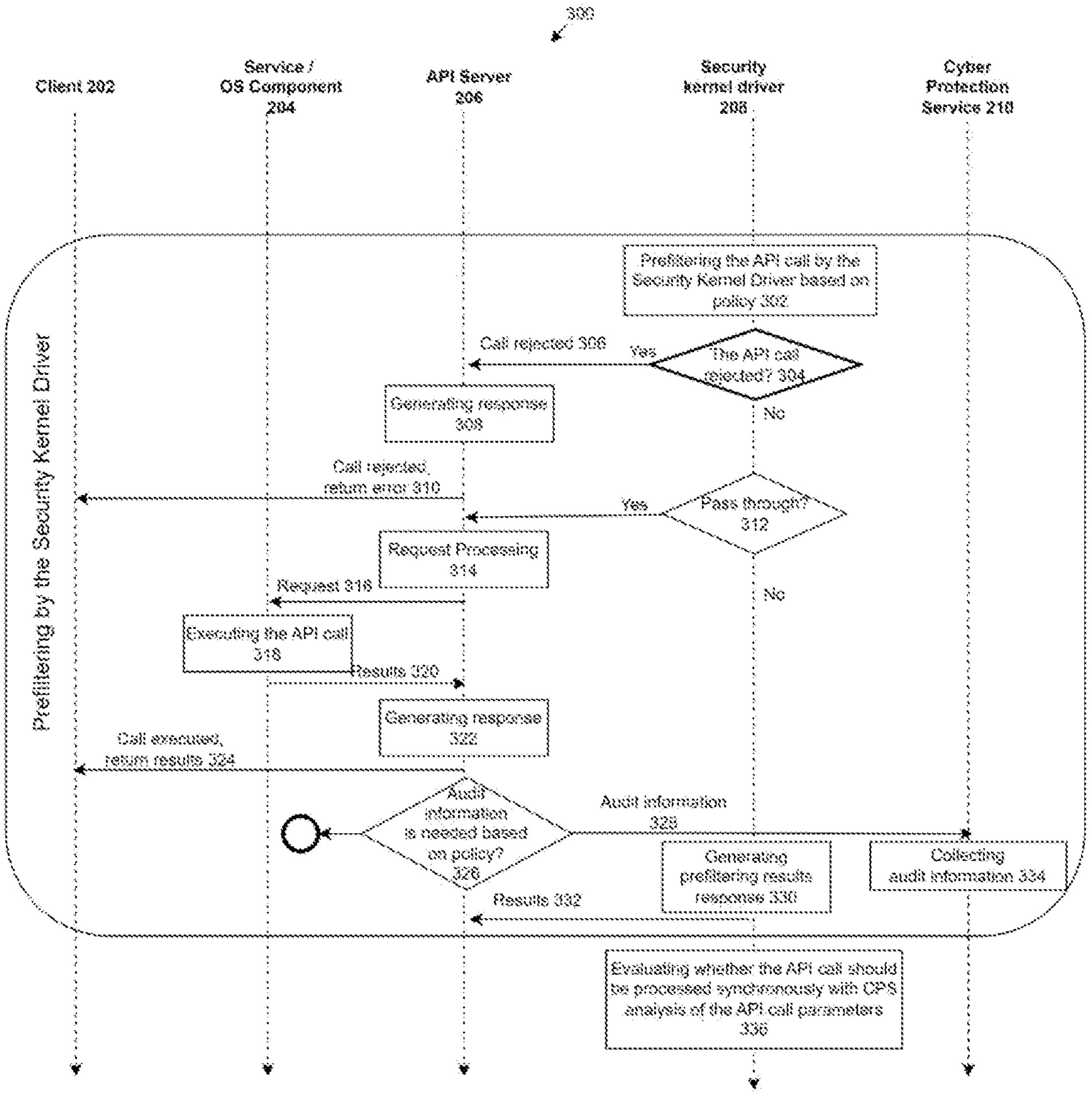
FIG. 3 is the second in a series of process flow diagrams showing aspects of a method in accordance with an embodiment.

FIG. 3 shows a continuation 300 of the method shown in FIG. 2, and generally concerns prefiltering by security kernel driver 208. Security kernel driver 208, which received API call information at operation 244 (shown in FIG. 2), prefilters the API call based on policy at operation 302. If the API call is rejected at operation 304, the call rejection is passed to API server 206. A response is generated at operation 308 and error 310 is returned to client 202. If the API is not rejected at operation 304, a decision about pass through is made at operation 312. If pass through is allowed at operation 312, this result is passed to API server 206 where request for processing 314 is made by way of request 316 to service/OS component 204. At operation 318, service/OS component 204 executes the API call at operation 318 and results 320 are passed to API server 206. API server 206 generates a response at operation 322 and results 324 are passed to client 202. If auditing information is needed, at operation 326 audit information 328 is passed to service 210, which collects audit information at operation 334. If the pass-through decision at operation 312 is no, a prefiltering results response is generated at operation 330 and an evaluation is made at operation 336 about whether the API call should be processed synchronously with CPS analysis of the API call parameters.

Figure 4:
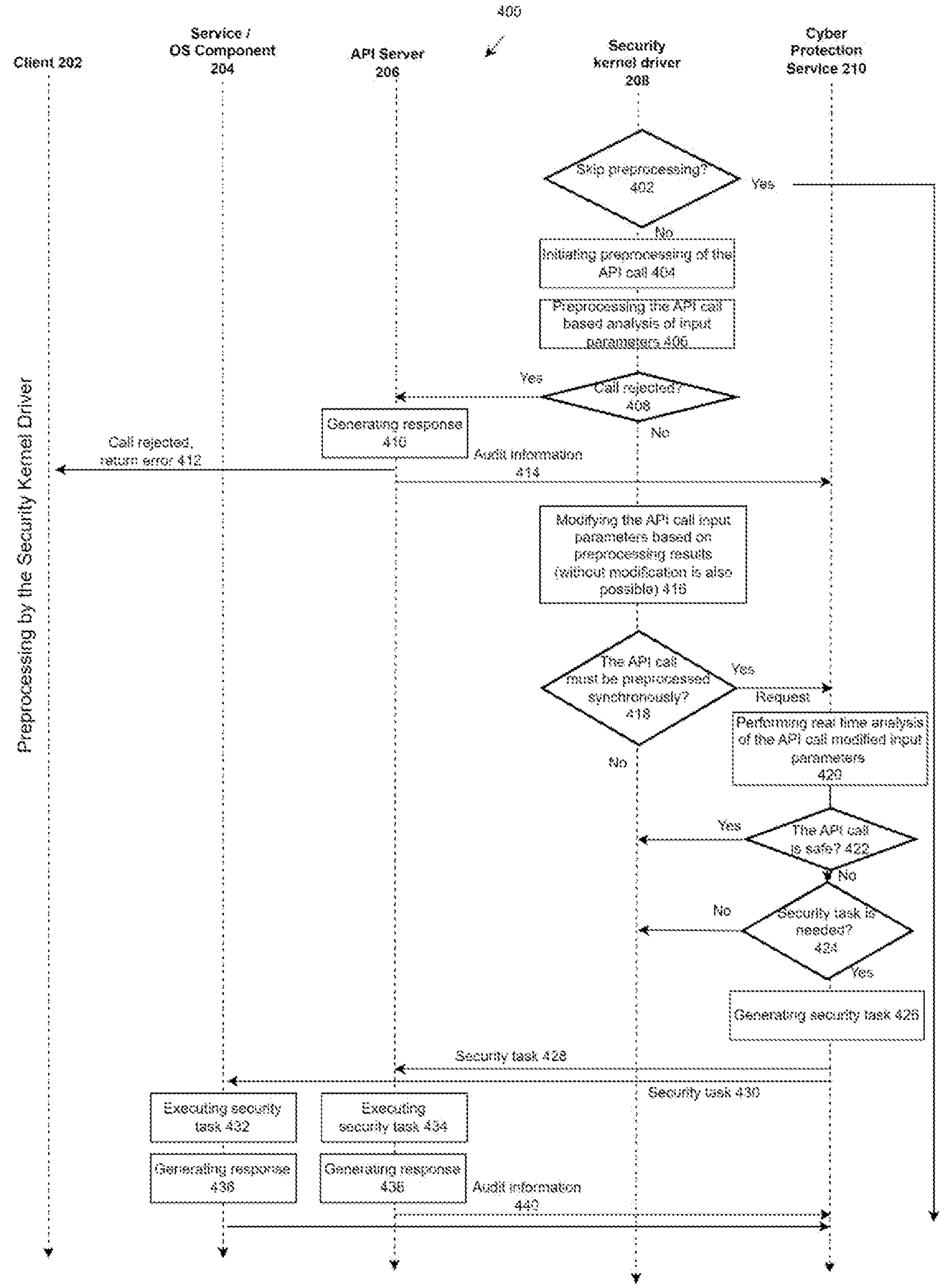
FIG. 4 is the third in a series of process flow diagrams showing aspects of a method in accordance with an embodiment.
Figure 5:
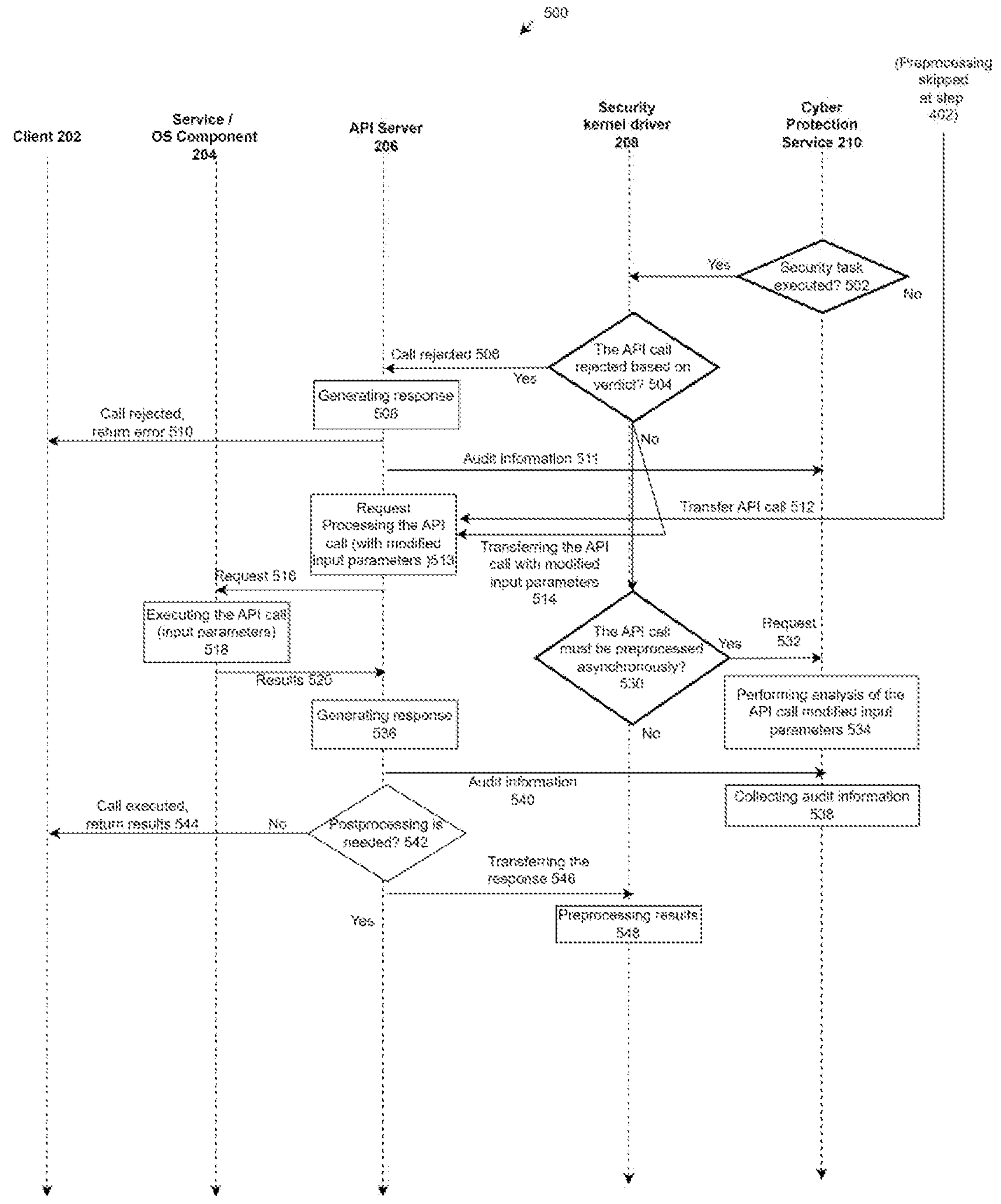
FIG. 5 is the fourth in a series of process flow diagrams showing aspects of a method in accordance with an embodiment.

FIG. 4 shows a continuation 400 of the method shown in FIG. 3 that generally focuses on preprocessing by the security kernel driver 208. At operation 402, a decision is made whether to skip preprocessing. If yes, the method continues as shown in FIG. 5. If preprocessing is not skipped, preprocessing of the API call is initiated at operation 404. Preprocessing of the API call continues at operation 406, with analysis based on API call input parameters. At operation 408, a decision is made about the API call. If the call is rejected at operation 408, the decision is passed to API server 206, which generates a response at operation 410. The rejected API call is returned at operation 412 as an error to client 202. Audit information about the rejection is optionally passed to service 210 at this point. If the API call is not rejected at operation 408, further preprocessing takes place at operation 416.

Operation 416 comprises modifying the API call input parameters based on the preprocessing results. This operation can be omitted, and preprocessing can continue without modifying the input parameters. At operation 418, security kernel driver 208 decides whether to process the API call synchronously. If yes, the request is passed to service 210 and real-time analysis of the API input parameters is performed at operation 420. For example, the request can be processed immediately while the system waits for the results of the analysis. The real-time analysis can also comprise prioritized processing, where the analysis is performed before any subsequent calls, such as subsequent calls that rely on the API call. If the API call input parameters were modified at operation 416, the modified input parameters are analyzed. A determination is then made whether the API call is safe at operation 422. If yes, the decision is passed to security kernel driver 208. If not, a decision is made at operation 424 whether a security task is needed. If a security task is not needed at operation 424, the decision is passed to security kernel driver 208. If a security task is needed, a security task is generated by service 210 at operation 426. The security tasks in this context can be considered remediation calls in view of the modified input parameters. The generated security task is passed to API server 206 at operation 428. The generated security task is also passed to service/OS component 204 at operation 430. The service/OS component executes the security task at operation 432. The API server executes the security task at operation 434. Each of service/OS component 204 and API server 206 generate responses 436 and 438, respectively, and pass them to service 210.

FIG. 5 shows the operations 500 that follow from the operations shown in FIG. 4. The execution of the security task generated at operation 426 (shown in FIG. 4) is checked by service 210 at operation 502. If the security task has been executed, service 210 notifies security kernel driver 208. Security kernel 208 decides at operation 504 whether the API call was rejected based on a verdict. If the API was rejected based on a verdict, security kernel driver 208 notifies API server 206 at operation 506, which generates a response at operation 508. API server 206 then returns an error 510 to client 202 to indicate that the API call was rejected. If an audit is being made, audit information 511 is passed from API server 206 to service 210.

If preprocessing was skipped at operation 402 (shown in FIG. 4), the API call is passed to API server 206 as API call 512. A request for processing the API call is made at operation 513. Alternatively, if the API call was not rejected at operation 504, the API call is transferred at operation 514. The transferred API call comprises modified input parameters if input parameters were modified at operation 416. In this case, the request for processing the API call at operation 513 comprises the modified input parameters. The processing request is passed to service/OS component 204 at operation 516. The API call is executed, with modified or unmodified input parameters, at operation 518 by service/OS component. Results 520 are passed to API server 206, which generates a response at operation 536. Any audit information 540 that has been collected about the response is passed to service 210 and collected at operation 538. Based on the generated response at operation 536, a decision about whether postprocessing is needed at operation 542. If no, then the call is executed and the results returned to client 202 at operation 544. If postprocessing is needed, the method continues as shown in FIG. 6.

If the API call is not rejected based on a verdict at operation 504 or the type of preprocessing is asynchronous, security kernel driver 208 transfers (514) the API call with modified input parameters to API server 206 to execute operation 518. In parallel with transfer 514, security kernel driver 208 decides whether the API call must be processed asynchronously at operation 530. If so, a request 532 is made to service 210, which performs analysis of the API call (including any modified input parameters) at operation 534. Referring again to the other parallel operation, security kernel driver 208 generates preprocessing results at operation 548.

Figure 6:
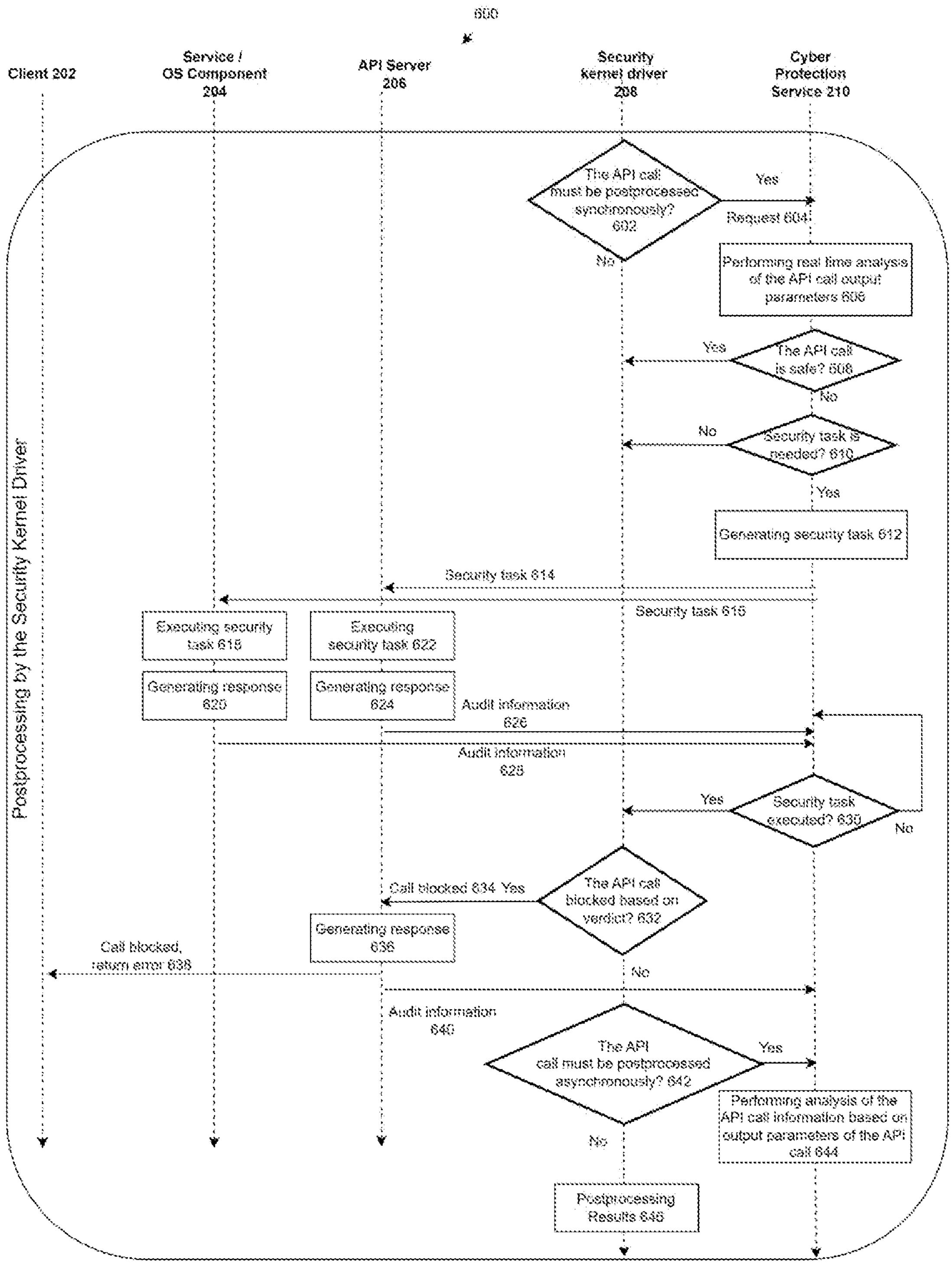
FIG. 6 is the fifth in a series of process flow diagrams showing aspects of a method in accordance with an embodiment.

FIG. 6 continues with operations 600, which continue the process shown in FIG. 5. The preprocessing results generated at operation 548 lead to a decision by security kernel driver 208 whether the API call must be postprocessed synchronously. If so, request 604 is made to service 210 and a real-time analysis of the API call output parameters is made at operation 606. Real-time analysis comprises immediate analysis or prioritized analysis relation to other calls being processed by the system. A decision is then made about whether the API call is safe at operation 608. If the API call is safe it is passed to security kernel driver 208. If not, service 210 decides at operation 610 whether a security task is needed. If the decision at operation 610 is no, the API call is passed to security kernel driver 208. If the decision is yes, a security task is generated at operation 612. The security tasks in this context can be considered remediation calls in view of the modified input parameters. The generated security task is passed to API server 206 at operation 614 and passed to the service/OS component at operation 616.

At operation 618, service/OS component 204 executes the security task and generates a response 620. At operation 622 the API server also executes the security task and generates a response. If an audit is required, audit information is passed from API server 206 to service 210 at operation 626. Audit information is also passed from service/OS component 204 at operation 628.

Service 210 then decides whether the security task has been executed at operation 630. If the security task has been executed, security kernel driver 208 is informed and decides whether the API call should be blocked based on a verdict at operation 632. If yes, the API server is notified at operation 634 and the API server generates a response at operation 636. The response is communicated to client 202 at operation 638 in the form of returning an error saying that the call has been blocked. Any audit information is sent from API server 206 at operation 640 to service 210. In some situations, an API call is allowed to execute and then is blocked later by either synchronous or asynchronous postprocessing. In such cases, the API call may be considered rejected from the client's point of view, even though it has been allowed to execute, in the sense that the API call will be blocked from further execution or from delivering any results to the client. API calls that have not been rejected and allowed to execute are considered blocked if they are later stopped from further execution during postprocessing.

Returning to operation 632, if the API call is not blocked based on the verdict—or if there was no synchronous processing and therefore no blocking—then security kernel driver 208 decides whether the API call must be postprocessed asynchronously at operation 642. If so, this is passed to service 210, which analyzes the API call information based on output parameters of the API call at operation 644. If not, postprocessing results are generated at operation 646.

Figure 7:
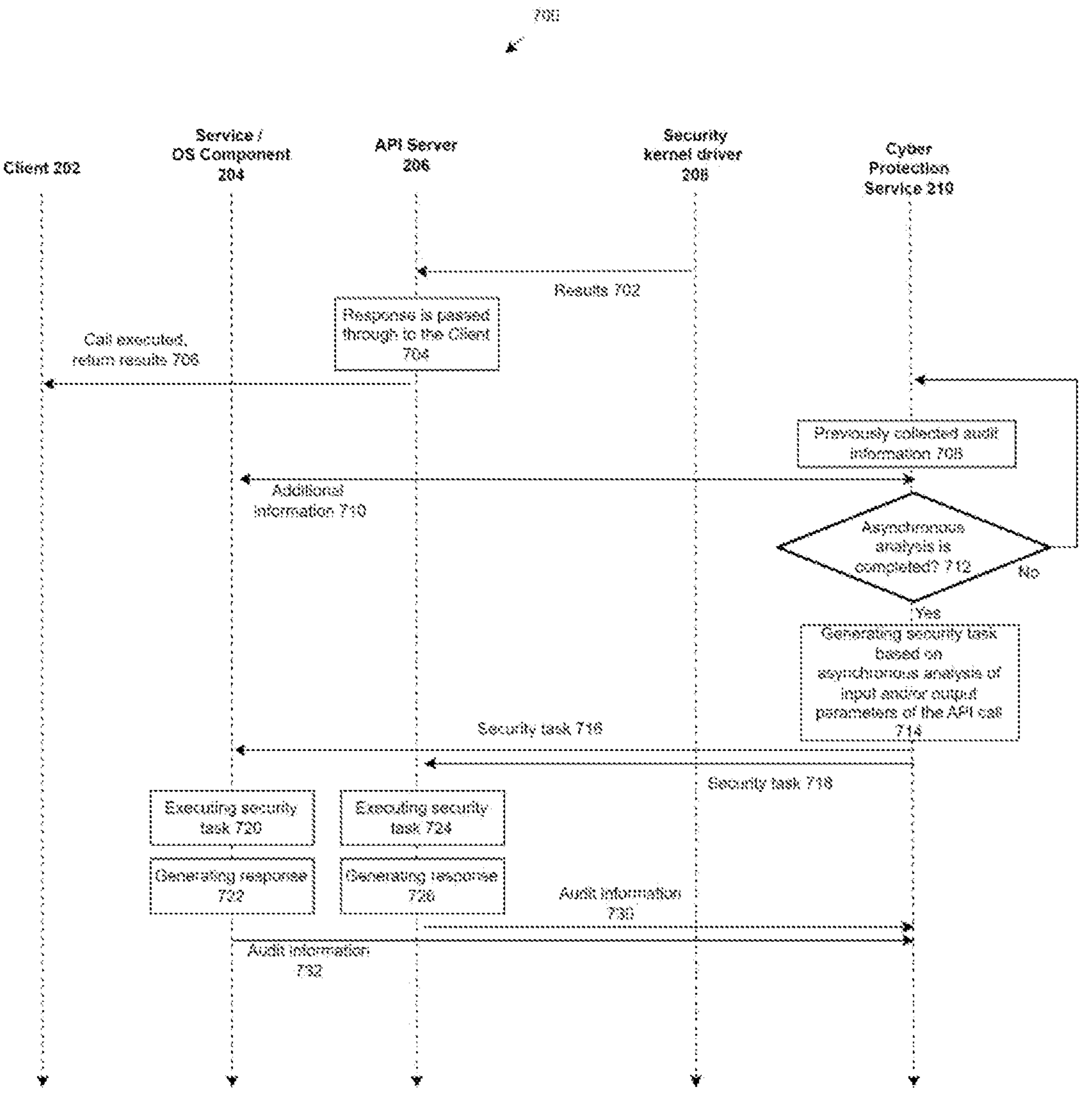
FIG. 7 is the sixth in a series of process flow diagrams showing aspects of a method in accordance with an embodiment.

The operations shown in FIG. 6 are continued in the operations 700 shown in FIG. 7. The postprocessing results generated at operation 646 are passed to API server 206 at operation 702. The response is then passed at operation 704 to client 202, which receives results of the executed API call at operation 706. The audit information collected by service 210 is evaluated at operation 708 and additional information is requested from service/OS component 204 at operation 710 and returned to service 210. Service 210 then decides whether asynchronous analysis is complete at operation 712. If not, the process of operations 708 and 710 are repeated until the asynchronous analysis is complete. At this point, security tasks can be generated based on asynchronous analysis on the input or output parameter of the API call at operation 714. At operation 716 the security task is passed to service/OS component 204 and at operation 718 the security task is passed to API server 206. Service/OS component executes the security task at operation 720 and generates a response at operation 722. API server 206 executes security task 724 at operation 724 and generates a response at operation 726. Any audit information is passed from API server 206 to service 210 at operation 730 and audit information from service/OS component 204 is passed to service 210 at operation 732.

The invention claimed is:

1. A method for managing Application Program Interface (API) calls from a client to an API server in a computer system comprising a security kernel driver and a protection service, the method comprising:

injecting a security dynamic link library (DLL) into the API server, wherein the security DLL is configured to monitor API calls related to specific system functions;

hooking an API call of a client to the API server by the security DLL;

analyzing the API call information by the security DLL to determine an identity of the client;

impersonating the client by the security DLL to get security rights of the client;

prefiltering the API call by the security DLL by evaluating API call input parameters against a predefined security DLL policy to determine an API call status, wherein the API call is passed to the security kernel driver;

prior to executing the API call, preprocessing, by the security kernel driver, the API call, wherein the preprocessing comprises synchronous preprocessing including:

communicating API call modified input parameters to the protection service to get a first synchronous verdict and either:

rejecting the API call with modified or unmodified input parameters based on the first synchronous verdict, or allowing the API call with modified input parameters to be executed based on the first synchronous verdict;

executing the API call, the API call generating API call output parameters; and after execution of the API call, determining, by the security kernel driver, that the API call requires postprocessing;

wherein the postprocessing comprises synchronous postprocessing when the API call output parameters are an immediate risk to the computer system;

wherein the postprocessing comprises asynchronous postprocessing when the API call output parameters do not pose an immediate risk to the computer system;

postprocessing the API call; and initiating, by the security kernel driver, a security action based on the synchronous or the asynchronous postprocessing, wherein the security action is one of:

initiating a protection mechanism;

executing remediation procedures;

backup of a state requested to be overwritten by the API call; or triggering a rollback of system changes associated with the API call.

2. The method of claim 1, wherein the synchronous postprocessing comprises:

communicating the API call output parameters to the protection service to get a second synchronous verdict; and blocking the API call based on the second synchronous verdict.

3. The method of claim 1, wherein the synchronous postprocessing comprises:

communicating the API call output parameters to the protection service to get a second synchronous verdict;

adjusting the API call output parameters; and allowing the API call with the adjusted API call output parameters based on the second synchronous verdict.

4. The method of claim 1, wherein the asynchronous postprocessing comprises:

communicating the API call output parameters to the protection service to get a second asynchronous verdict;

monitoring the API call based on the second asynchronous verdict.

5. The method of claim 1, wherein the security kernel driver further processes the API call by:

collecting for audit purposes the API call information; and initiating, by the security kernel driver, a security action based on the first synchronous verdict, wherein the security action initiates a protection mechanism.

6. The method of claim 1, wherein the protection mechanism isolates affected system components, alerts system administrators, or updates system security configurations.

7. The method of claim 1, wherein remediation procedures comprise a rollback comprising reversing the effects of the API call and restoring affected system settings or files to a previous state.

8. The method of claim 7, wherein rollback comprises reverting system changes made as a result of the API call to a predefined safe state.

9. A method for managing Application Program Interface (API) calls from a client to an API server in a computer system comprising a security kernel driver and a protection service, the method comprising:

injecting a security dynamic link library (DLL) into the API server, wherein the security DLL is configured to monitor API calls related to specific system functions;

hooking an API call of a client to the API server by the security DLL;

analyzing the API call information by the security DLL to determine an identity of the client; and impersonating the client by the security DLL to get security rights of the client;

prefiltering the API call by the security DLL by evaluating API call input parameters against a predefined security DLL policy to determine an API call status, wherein the API call is passed to the security kernel driver;

prior to executing the API call, preprocessing, by the security kernel driver, the API call, wherein the preprocessing comprises asynchronous preprocessing including:

execution of the API call with modified or unmodified input parameters to get API call output parameters, and passing of the modified or unmodified input parameters to the protection service to get a first asynchronous verdict;

executing the API call, the API call generating API call output parameters; and after execution of the API call, determining, by the security kernel driver, that the API call requires postprocessing;

wherein the postprocessing comprises synchronous postprocessing when the API call output parameters are an immediate risk to the computer system;

wherein the postprocessing comprises asynchronous postprocessing when the API call output parameters do not pose an immediate risk to the computer system;

postprocessing the API call based on the API call output parameters; and initiating, by the security kernel driver, a security action based on the synchronous postprocessing or the asynchronous postprocessing, wherein the security action is one of:

initiating a protection mechanism;

executing remediation procedures;

backup of a state requested to be overwritten by the API call; or triggering a rollback of system changes associated with the call.

10. The method of claim 9, wherein the asynchronous postprocessing comprises:

communicating the API call output parameters to the protection service to get a second asynchronous verdict; and monitoring the API call based on the second asynchronous verdict.

11. The method of claim 9, wherein the synchronous postprocessing comprises:

communicating the API call output parameters to the protection service to get a second synchronous verdict; and blocking the API call based on the second synchronous verdict.

12. The method of claim 9, wherein the synchronous postprocessing comprises:

communicating the API call output parameters to the protection service to get a second synchronous verdict;

adjusting the API call output parameters; and allowing the API call with the adjusted output parameters based on the second synchronous verdict.

13. The method of claim 9, wherein the security kernel driver further processes the API call by:

collecting for audit purposes the API call information;

initiating, by the security kernel driver, a security action based on the first asynchronous verdict, wherein the security action initiates a protection mechanism.

14. A method for managing Application Program Interface (API) calls from a client to an API server in a computer system comprising a security kernel driver and a protection service, the method comprising:

injecting a security dynamic link library (DLL) into the API server, wherein the security DLL is configured to monitor API calls related to specific system functions;

hooking an API call of a client to the API server by the security DLL;

analyzing the API call information by the security DLL to determine an identity of the client; and impersonating the client by the security DLL to get security rights of the client;

prefiltering the API call by the security DLL by evaluating parameters of the API call against a predefined security DLL policy to determine an API call status, wherein the API call is passed to the security kernel driver;

allowing, by the security kernel driver, execution of the API call without preprocessing, the API call generating API call output parameters; and after execution of the API call, determining, by the security kernel driver, that the executed API call requires postprocessing;

wherein the postprocessing comprises synchronous postprocessing when the API call output parameters are an immediate risk to the computer system;

wherein the postprocessing comprises asynchronous postprocessing when the API call output parameters do not pose an immediate risk to the computer system;

postprocessing the API call; and initiating, by the security kernel driver, a security action based on the synchronous or the asynchronous postprocessing, wherein the security action is one of:

initiating a protection mechanism;

executing remediation procedures;

backup of a state requested to be overwritten by the API call; or triggering a rollback of system changes associated with the API call.

15. The method of claim 14, wherein the asynchronous postprocessing comprises:

communicating the API call output parameters to the protection service to get a second asynchronous verdict; and monitoring the API call based on the second asynchronous verdict.

16. The method of claim 14, wherein the synchronous postprocessing comprises:

communicating the API call output parameters to the protection service to get a synchronous postprocessing verdict; and either adjusting the API call output parameters, allowing the API call with the adjusted output parameters based on the synchronous postprocessing verdict, or blocking the API call based on the synchronous postprocessing verdict.

17. The method of claim 1, wherein the postprocessing comprises at least one of:

registry enumeration of the API call output parameters, modification of file system access control list (ACL) using the API call output parameters, or monitoring of scheduled task creation based on the API call output parameters.

18. The method of claim 9, wherein the postprocessing comprises at least one of:

registry enumeration of the API call output parameters, modification of file system access control list (ACL) using the API call output parameters, or monitoring of scheduled task creation based on the API call output parameters.

19. The method of claim 1, wherein the security kernel driver transfers the API call modified input parameters for execution of the API call in parallel with deciding whether the API call must be processed asynchronously.

20. The method of claim 9, wherein the security kernel driver transfers the API call modified input parameters for execution of the API call in parallel with deciding whether the API call must be processed asynchronously.

* * * * *